United States Patent
Lisewski et al.

(10) Patent No.: US 10,142,913 B2
(45) Date of Patent: Nov. 27, 2018

(54) REFINING MULTICAST SERVICE AREA BASED ON LOCATION

(71) Applicant: Verizon Patent and Licensing Inc., Arlington, VA (US)

(72) Inventors: Kevin Lisewski, Mahwah, NJ (US); Robert Kaphan, Bloomsbury, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 15/480,897

(22) Filed: Apr. 6, 2017

(65) Prior Publication Data
US 2018/0295563 A1 Oct. 11, 2018

(51) Int. Cl.
| | |
|---|---|
| *H04W 24/00* | (2009.01) |
| *H04W 48/04* | (2009.01) |
| *H04L 12/18* | (2006.01) |
| *H04W 4/02* | (2018.01) |
| *H04W 48/16* | (2009.01) |

(52) U.S. Cl.
CPC .......... *H04W 48/04* (2013.01); *H04L 12/189* (2013.01); *H04W 4/026* (2013.01); *H04W 48/16* (2013.01)

(58) Field of Classification Search
CPC ...... H04W 48/04; H04W 4/026; H04L 12/189
USPC ...................................... 455/456.3
See application file for complete search history.

(56) References Cited

U.S. PATENT DOCUMENTS

| | | | | |
|---|---|---|---|---|
| 9,596,096 B2* | 3/2017 | Taylor | ................... | H04L 12/189 |
| 2007/0293249 A1* | 12/2007 | Wang | ................... | H04L 12/189 |
| | | | | 455/466 |
| 2012/0182921 A1* | 7/2012 | Tsuboi | ................... | H04W 4/021 |
| | | | | 370/312 |
| 2013/0003640 A1* | 1/2013 | Yang | ................... | H04W 72/005 |
| | | | | 370/312 |
| 2013/0128797 A1* | 5/2013 | Newberg | ............ | H04L 12/1868 |
| | | | | 370/312 |
| 2013/0276017 A1* | 10/2013 | Walker | ............. | H04N 21/44204 |
| | | | | 725/25 |
| 2013/0294318 A1* | 11/2013 | Amerga | ................... | H04W 4/06 |
| | | | | 370/312 |
| 2013/0308519 A1* | 11/2013 | Gou | ....................... | H04L 5/001 |
| | | | | 370/312 |
| 2013/0315128 A1* | 11/2013 | Zhao | ................... | H04W 72/005 |
| | | | | 370/312 |
| 2014/0177506 A1* | 6/2014 | Korus | ................... | H04W 4/06 |
| | | | | 370/312 |
| 2014/0192697 A1* | 7/2014 | Anchan | ............... | H04W 72/005 |
| | | | | 370/312 |
| 2015/0222697 A1* | 8/2015 | Bassiouny | ........... | H04L 67/1002 |
| | | | | 709/203 |

(Continued)

Primary Examiner — Charles Shedrick

(57) ABSTRACT

A method for refining multicast service areas based on location may include receiving, at a mobile device, location-based definitions of service subareas located within a multimedia broadcast multicast service (MBMS) service area. Different MBMS content may be associated with two or more service subareas. The method includes storing the received location-based definitions of the service subareas within the mobile device, generating a current position of the mobile device, identifying a service subarea from the plurality of service subareas that circumscribes the current position of the mobile device, and permitting, in response to the identifying, user access to MBMS content associated with the identified service subarea.

20 Claims, 9 Drawing Sheets

(56) References Cited

U.S. PATENT DOCUMENTS

2016/0241610 A1* 8/2016 Zhang ................... H04W 4/06
2017/0041748 A1* 2/2017 Kodaypak ........... H04L 12/1845

* cited by examiner

| CONTENT | SERVICE SUBAREA NAME | AREA BOUNDARY DEFINITION |
|---|---|---|
| VIDEO | NATIONAL PORTRAIT GALLERY | 38.898271, -77.022534<br>38.898281, -77.022256<br>38.897475, -77.022235<br>38.897534, -77.022926<br>38.897649, -77.023002<br>38.897665, -77.022601 |
| AUDIO | VERIZON CENTER | 38.8981247, -77.020963; R43 |
| EMERGENCY ALERTS | GALLERY PLACE CHINATOWN METRO STATION | 38.898484, -77.021967<br>38.898405, -77.021988<br>38.898382, -77.021800<br>38.898486, -77.021808 |

Fig. 5

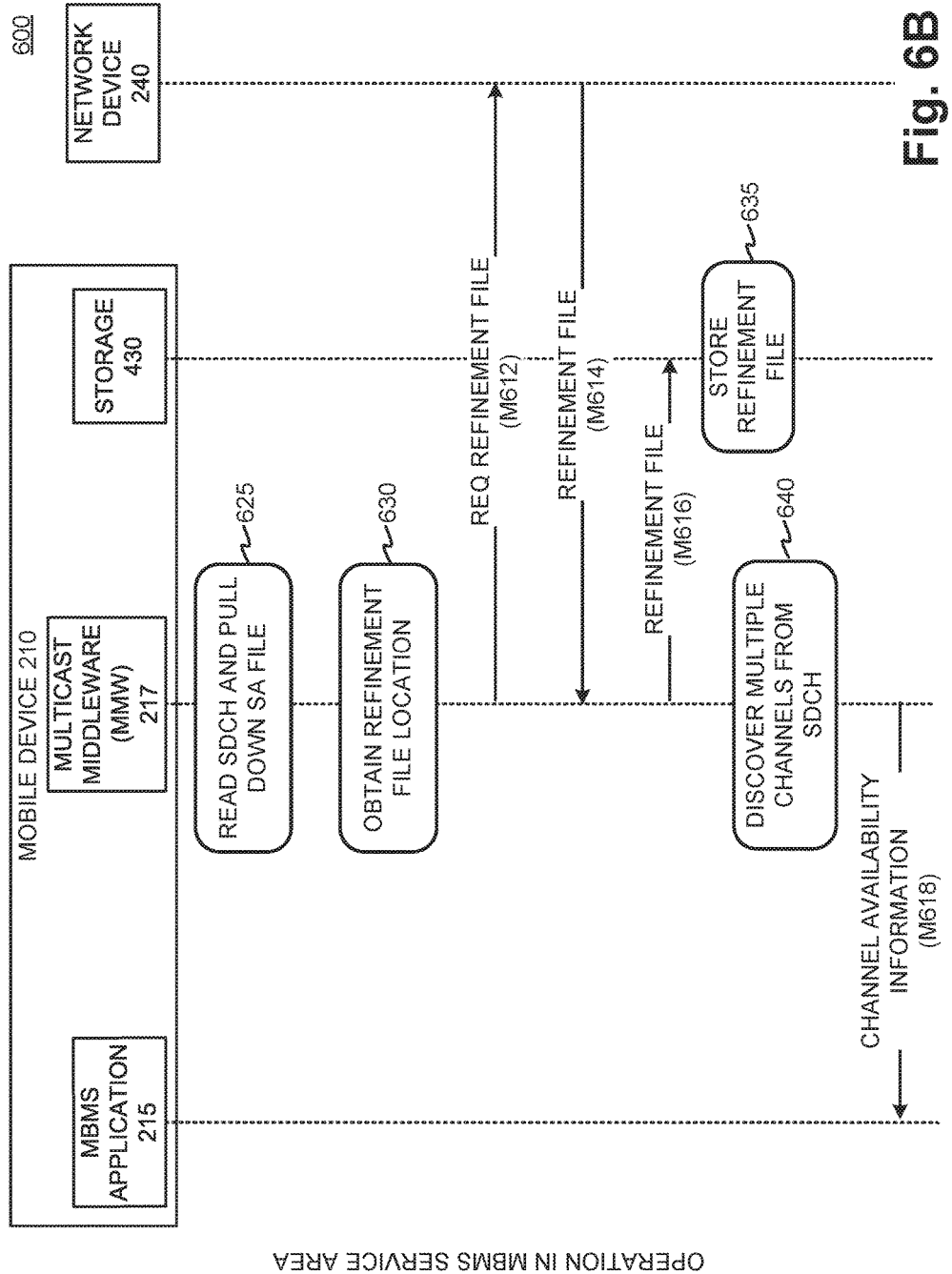

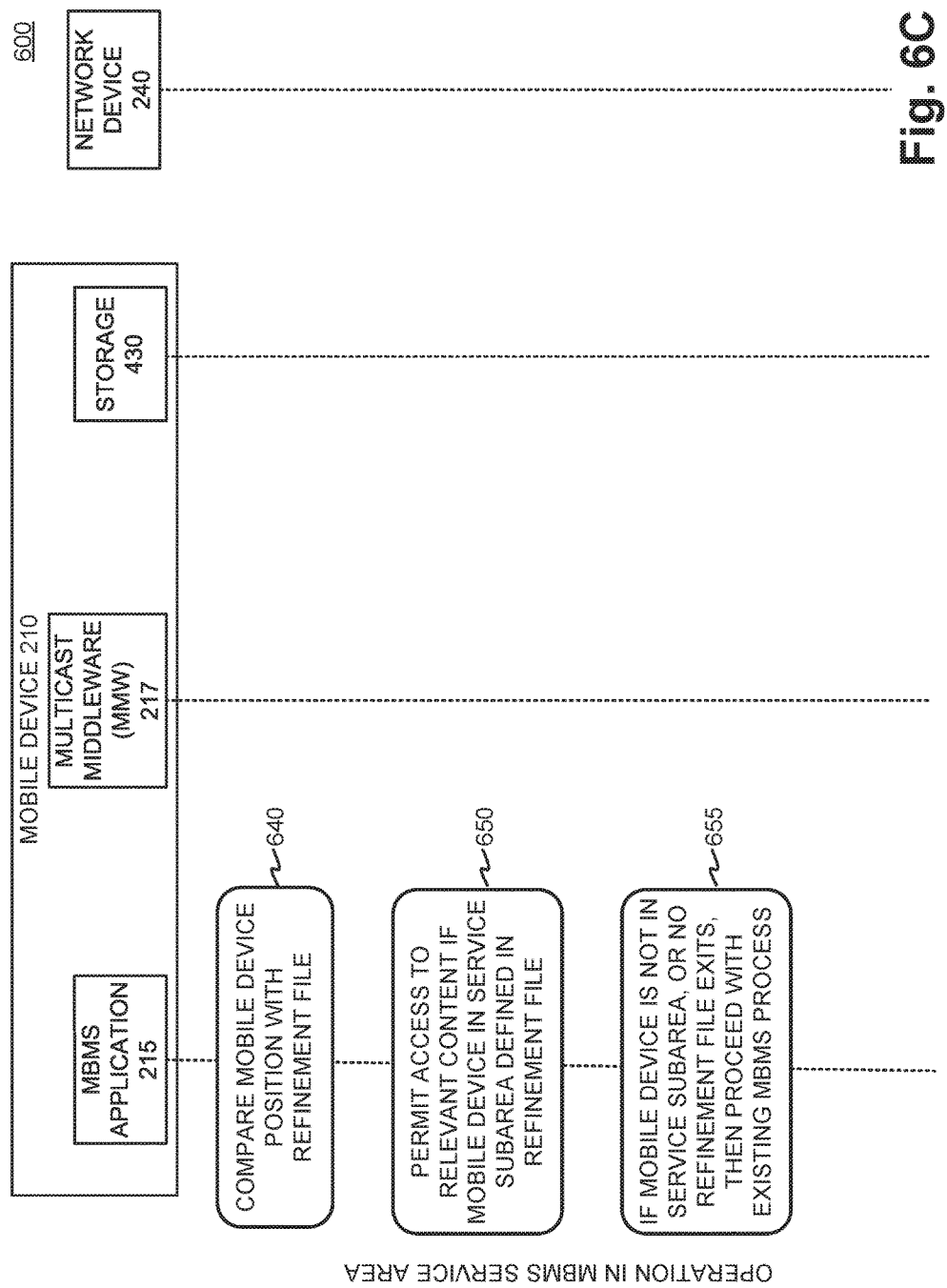

REFINING MULTICAST SERVICE AREA BASED ON LOCATION

BACKGROUND

In order to satisfy the needs and demands of users of mobile communication devices, providers of wireless communication services continue to improve and expand available services as well as networks used to deliver such services. One aspect of such improvements includes the development of wireless access networks which may broadcast/multicast content to a particular geographic area and/or a particular group of users. Using broadcast and/or multicast services, a base station may efficiently provide content to a large number of wireless devices. However, precisely targeting geographic areas for specific services may be a challenge with existing broadcast and/or multicast services.

BRIEF DESCRIPTION OF THE DRAWINGS

FIG. 5 is a diagram illustrating an exemplary data structure associated with a refinement file;

FIGS. 6A-6C are exemplary signal flow diagrams 600 illustrating communications between network entities for refining MBMS service areas based on location.

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

Embodiments described herein are directed to refining the placement, shape, and/or sizing of service areas for multicast services. Broadcast and multicast services can be provided, for example, through Long Term Evolution (LTE) wireless standards (e.g., LTE, LTE Advanced, etc.). The LTE broadcasting and/or multicasting standards may include Multimedia Broadcast Multicast System (MBMS) standards, such as, for example, the evolved Multimedia Broadcast Multicast System (eMBMS) standard. MBMS service provides an efficient mechanism to deliver common content over LTE networks which may be directed to targeted service areas.

While conventional MBMS systems allows some control over the size of service areas, such control is limited and may lack the flexibility of precisely specifying the shape, location, and/or size of a particular service area. For example, conventional MBMS lacks the ability to specify small service areas to allow for targeted and granular content delivery. In conventional systems, network conditions and/or wireless channel interference may limit the precision for specifying the shape and/or placement of the MBMS service area, and/or place an upper bound on the minimum size of an MBMS service area. For example, areas of dense network deployment (e.g., theme parks, stadiums, major metro areas, etc.) can create significant radio frequency (RF) interference that limits the geometric granularity of the MBMS service area. Alternatively, areas of sparse network deployment may have large inter-cell site distances which may also limit the minimum size of an MBMS service area. To improve the utility of MBMS services, the limits on the minimum size of MBMS service areas should be as small as possible to allow for targeted and granular content delivery.

Figure 1:
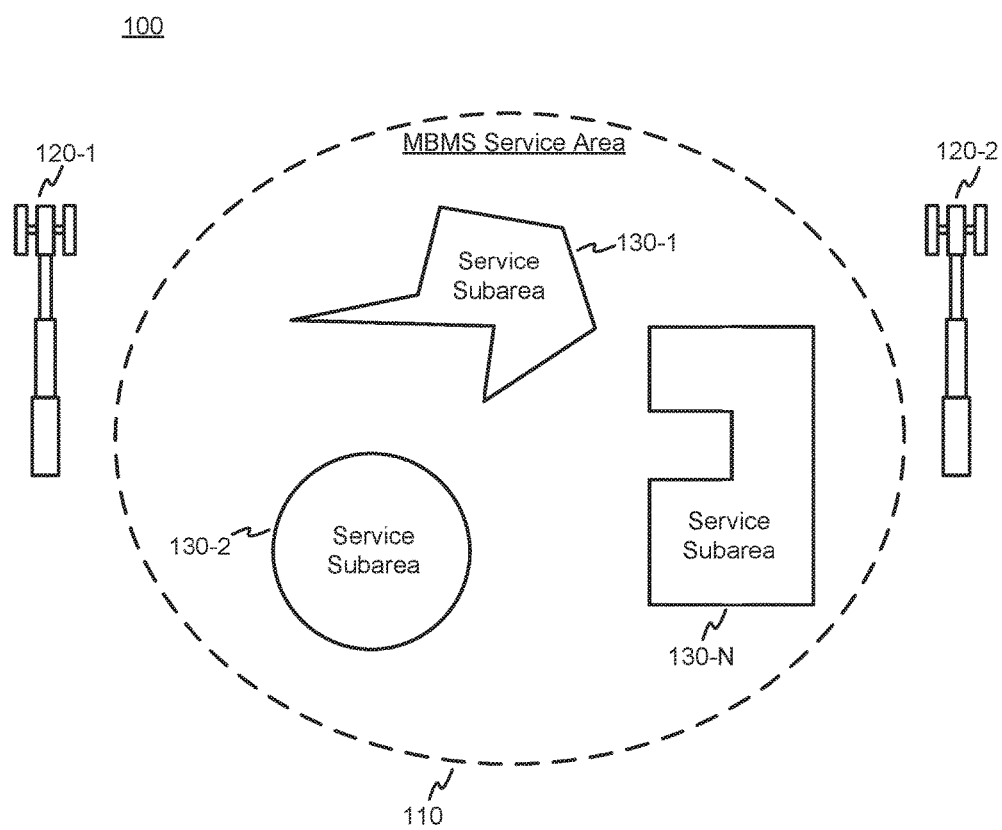
FIG. 1 is a diagram showing an exemplary environment associated with a multimedia broadcast multicast service (MBMS) having refined service subareas.

FIG. 1 is a diagram showing an exemplary environment 100 associated with an MBMS system having refined service subareas. Environment 100 may include an MBMS area 110, evolved NodeBs (eNodeBs) 120 (herein referred to plurally as "eNodeBs 120," generically as "eNodeB 120," and individually as "eNodeB 120-$x$"), and service subareas 130 (herein referred to plurally as "service subareas 130," generically as "service subarea 130," and individually as "service subarea 130-$x$"). In environment 100, one or more eNodeBs 120 may establish MBMS service area 110 by providing coordinated transmissions for reception by one or more mobile devices (not shown) in MBMS service area 110. Multicast transmissions may be provided using a simulcast technique that sends similar waveforms at substantially the same time from one or more eNodeBs 120. While the embodiment shown in FIG. 1 may use an LTE based system to provide MBMS (e.g., eMBMS) service, other multicast and/or broadcast approaches/wireless standards may be used in other embodiments. For example, MBMS techniques associated with Global System for Mobile (GSM) communication standards may be used in other implementations.

Within MBMS service area 110, additional service subareas 130 may be established that can provide differentiated MBMS content to mobile devices when located within a respective service area 130. The content available to mobile devices when located within a particular service subarea 130-$x$ may be different to content accessible outside that particular service subarea 130-$x$. Accordingly, each service subarea 130 may provide access to unique content when mobile devices 130 are located within a given service subarea 130. By partitioning content based on the location-based definitions of the service subareas 130, separate channels are available to mobile devices within a single MBMS service area 110. When a mobile device transitions out of a service subarea 130-$x$, the content associated with service subarea 130-$x$ is no longer available to that mobile device 130. The size, location, and/or shape of the service subareas 130 may be specified with greater precision than MBMS service area 110, thus embodiments provide the ability to target customers with improved precision. Moreover, each service subarea 130 may also serve as a secondary authentication method when the content is sensitive or proprietary. A "position based" authentication based on service subareas 130 may be an extension to conventional authentication associated with eMBMS service classes.

Each service subarea 130 can be defined with a set of parameters and may be stored in a "refinement file." In general, the set of parameters may be stored in any type of data structure, and is not limited to being stored within a file format. The refinement file may include location-based information to describe the location and/or position of each service area 130. In an embodiment, location-based information may include coordinates defining a position in a standard reference coordinate system to define each service subarea 130. The coordinates may include, for example, the World Geodetic System 1984 (WGS-84) used by the Global Positioning System (GPS). Accordingly, a service subarea 130 may be defined using geodetic coordinates (e.g. latitude (lat), longitude (lon)) indicating the vertices of any desired shape. For example, any general polygon, such as service subarea 130-1 and service subarea 130-N, may be defined by specifying the coordinates of each vertex. Other shapes may be specified by providing geometric parameters sufficient to define a particular shape. For example, circular service subarea 130-2 may be specified by identifying a geographic coordinate for the center of the circle (e.g., in lat, lon), and further defining a radius or diameter of the circle. In another example, a service subarea 130 shaped as a square or rectangle may be defined by specifying a geographic coordinate for a corner, and specifying the size of a side for the square, or specifying the size of two sides for the rectangle. Other standard shapes may be specified using known techniques. In another embodiment, location-based information may include standard names for locations, which may automatically be converted to coordinates by looking up the locations in a database which may be located on a network attached device and/or with an internal memory in the mobile device. While service subareas 130 are shown as non-overlapping in FIG. 1, embodiments may include overlapping service subareas 130. Overlapping service subareas 130 may permit a mobile device to simultaneous access to multiple types of content associated with each service subarea 130 included in an area that is overlapping with another area.

As will be explained in more detail below in reference to FIG. 6A-6C, prior to or after entering MBMS Service Area 110, each mobile device may obtain the refinement file and check its position to determine if the mobile device is within a particular service subarea 130-*x*. If the mobile device is located within service subarea 130-*x*, access to content that is associated with service area 130-*x* may be provided to the mobile device. The position of the mobile device may be periodically checked against the refinement file, so the mobile device may provide access to the proper content associated with the service subarea for which the mobile device is located.

Figure 2:
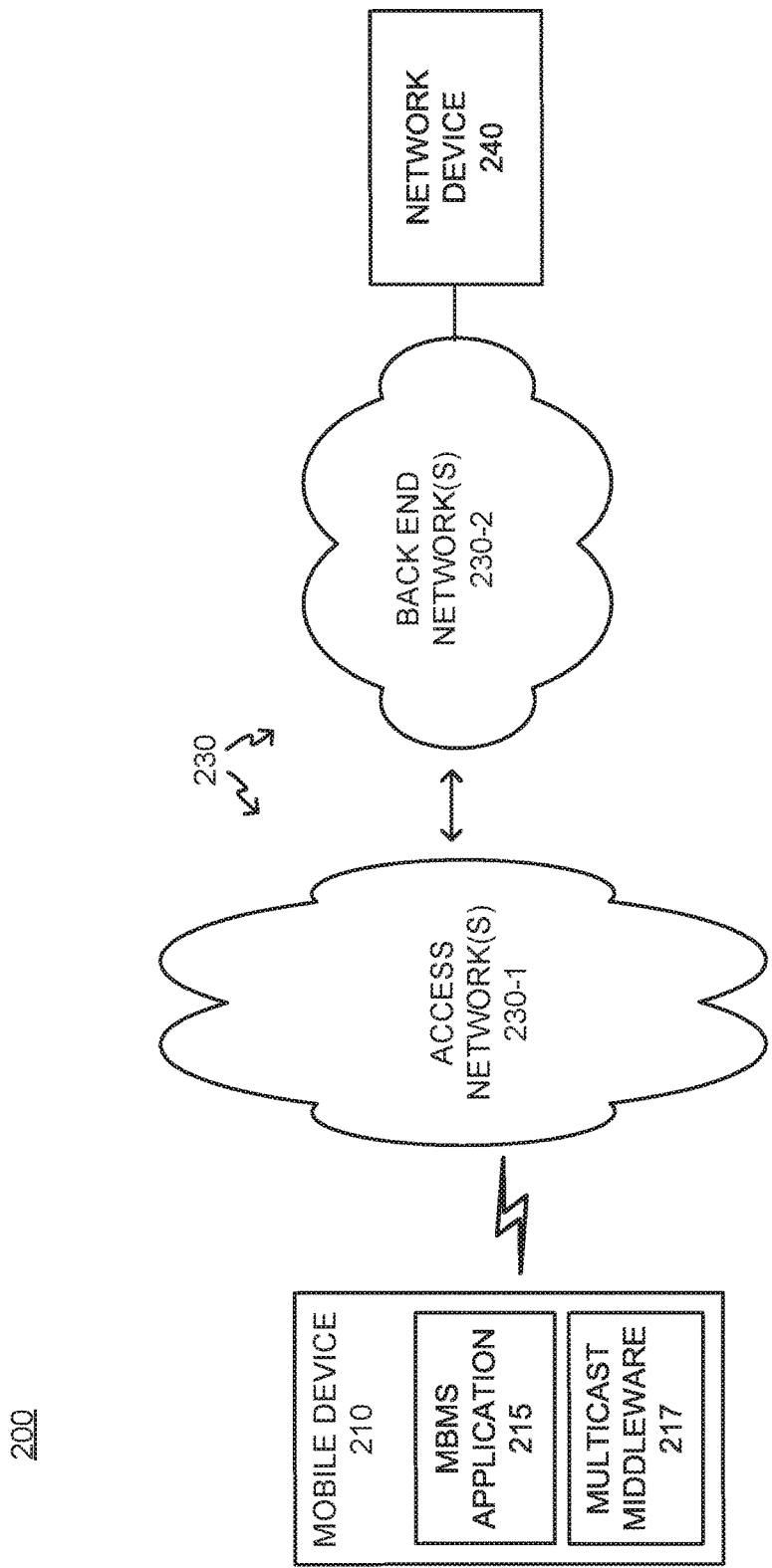
FIG. 2 is a block diagram showing an exemplary networking environment for providing a multicast service area according to an embodiment.

FIG. 2 is a block diagram showing an exemplary networking environment 200 for providing a multicast service area according to an embodiment. The environment may include a mobile device 210 and a network device 240 that may be interconnected by a plurality of networks 230 to provide communications over a variety of different connections. Mobile device 210 may include an MBMS application 215 and multicast middleware 217 for facilitating reception of MBMS content. For ease of explanation, only one mobile device 210 and network device 240 are illustrated as being connected to networks 230. However, it should be understood that a plurality of mobile devices 210, network devices 240, and/or other known network entities, may be communicatively coupled to networks 230.

Networks 230 may include a plurality of networks of any type, and may be broadly grouped into one or more access network(s) 230-1 and one or more back end network(s) 230-2. Access network(s) 230-1 provides connectivity between mobile device 210 and other network elements within access network(s) 230-1 and/or back end network(s) 230-2. Access network(s) 230-1 may include, for example, a telecommunications network (e.g., a Public Switched Telephone Network (PSTN)), wired (e.g., Ethernet) and/or wireless local area network(s) (LAN) (e.g., WiFi), wireless wide area networks (WAN) (e.g., WiMax), and/or one or more wireless public land mobile networks (PLMNs). The PLMN(s) may include a Code Division Multiple Access (CDMA) 2000 PLMN, a Global System for Mobile Communications (GSM) PLMN, a Long Term Evolution (LTE) PLMN and/or other types of PLMNs not specifically described herein. In other embodiments, access network(s) 230-1 may alternatively or additionally include any type of Wi-Fi (e.g., any IEEE 801.11x network, where x=a, b, c, g, and/or n). A wide area wireless network may include any type wireless network covering larger areas, and may include a mesh network (e.g., IEEE 801.11s) and/or or a WiMAX IEEE 802.16.

Back end network(s) 230-2 may exchange data with access network(s) 230-1 to provide mobile device 210 connectivity to various servers, gateways, and other network entities, which may include one or more network device (s) 240. Back end network(s) 230-2 may include a wide area network (WAN), a metropolitan area network (MAN), an intranet, the Internet, a wireless satellite network, a cable network (e.g., an optical cable network).

Mobile device 210 may include any type of electronic device having communication capabilities, and thus communicate over networks 230 using a variety of different channels, including both wired and wireless connections. Mobile device 210 may include, for example, a cellular radiotelephone, a smart phone, a tablet, a set-top box (STB), a mobile phone, a Voice over Internet Protocol (VoIP) device, a laptop computer, a palmtop computer, a gaming device, a wearable computer (e.g., a smart watch), a media player device, or a digital camera that includes communication capabilities (e.g., wireless communication mechanisms). Mobile device 210 may also be referred to as a "User Equipment" (UE) device when discussed in context with LTE and/or LTE Advanced wireless networks.

Mobile device 210 may further include one or more MBMS applications 215 and multicast middleware 217. MBMS application 215 may execute on the mobile device 210 to provide a user interface for receiving MBMS content from a particular service provider and thus permit the user to tune into an MBMS channel of interest. Multicast middleware 217 may control the modem of mobile device 210 and provide functionality for tuning into an MBMS broadcast. Thus, multicast middleware 217 may act as a "shim" layer between the modem firmware and MBMS application 215. MBMS application 215 may be a general applications that allows a user to select from a plurality of streams having general interest. Additionally or alternatively, MBMS application 215 may enable access to content which may be tailored to a more specific interest, and can be associated to a particular organization, event, general location, etc. By using a refinement file to specify service subareas, MBMS application 215 may receive content with greater precision and specificity than can be received with conventional MBMS approaches.

For example, an exemplary MBMS application 215 may be provided by a theme park which is serviced by an MBMS service area 110. Content may be provided to visitors of the theme park regarding promotions, schedules for shows, queues for rides. As a convenience to the user, content may be differentiated based on service subareas 130. Because the rides are typically located too close together for separate MBMS service areas, single MBMS service area 110 may be used in conjunction with service subareas 130 to provide separate channels of content based on location. Service subarea 130-1 may be established around a first popular ride, and service subarea 130-2 may be established around a second popular ride, based on definitions provided in the refinement file. Accordingly, while users are queueing, or waiting in line, for each ride, different video streams may be provided to mobile devices 130 while users wait to board their respective ride. When a user is in a particular service subarea 130-*x* queueing for their respective ride, the multicast middleware 217 will receive and identify the streams associated with all service subareas 130, but MBMS application 215 will "filter" the received streams by checking the current position of mobile device 210, and only provide access to the MBMS content associated with the service subarea 130-*x* for which mobile device 210 is located.

In another example, a mobile device 210 may be installed in an automobile for use with vehicle control, telematics, entertainment, and/or communications. In an embodiment, mobile device 210 may include MBMS application 215 for receiving software updates for various automotive subsystems. Software updates received by mobile device 210 are manufacturer specific and may be proprietary and confidential, so maintaining control of the distribution of the software can be an important security concern. In one example, during transport of finished automobiles from manufacturers or distributors, a port of entry and/or exit may divide a shared space into multiple staging areas among multiple manufacturers. The staging areas may be too close together to be assigned separate MBMS service areas, so one MBMS service area 110 may be used to send data streams to the automobiles in the staging areas. The data streams may include sensitive information, such as software updates, so the data transfers include proprietary and confidential information for which security should be maintained. In an embodiment, the automobiles may be separated by manufacturer into distinct staging areas, where the staging area corresponds to a service subareas 130. Thus, service subarea 130-1 may include automobiles from Original Equipment Manufacturer (OEM) 1, service subarea 130-2 may include automobiles from OEM 2, and service subarea 130-N may include automobiles from OEM N.

For each mobile device 210 or other user equipment (UE) including communication functionality installed in an automobile (which may be included by the manufacturer), the proper service subarea 130-*x* may be defined in a refinement file which may be received before accessing an MBMS stream associated with MBMS service area 110. Thus, when an automobile from OEM 1 is parked in service subarea 130-1, the eMBMS application in mobile device 210 or another UE included in the automobile may check the current GPS location and determine whether the vehicle is parked within a service area 103-*x* defined in the refinement file. Once the mobile device 210 or other device determines the automobile from OEM 1 is parked in service subarea 130-1, the device may validate access to the data stream which includes a software update provided from OEM 1. The mobile devices 210 or other UEs within automobiles parked in other service subareas 130 than service subarea 130-1 would not be validated for access to software updates pushed by OEM 1.

Further referring to FIG. 2, network device 240 may be a server or other computing device that manages and distributes data associated with MBMS content. The data may include the refinement file, a stored configuration file (e.g., abootconfig file), and/or any type of content for user consumption. The bootconfig file may provide various configuration parameters for initializing mobile device 210 for receiving MBMS content. Network device 240 may communicate with device 210 over access network 130-1, and may communicate with other network devices such as various servers, administrate devices, security devices, etc., over back end network(s) 230-2. While only one network device 240 is shown in FIG. 1, in various embodiments, multiple network devices may be associated with different entities and used within environment 200.

Figure 3:
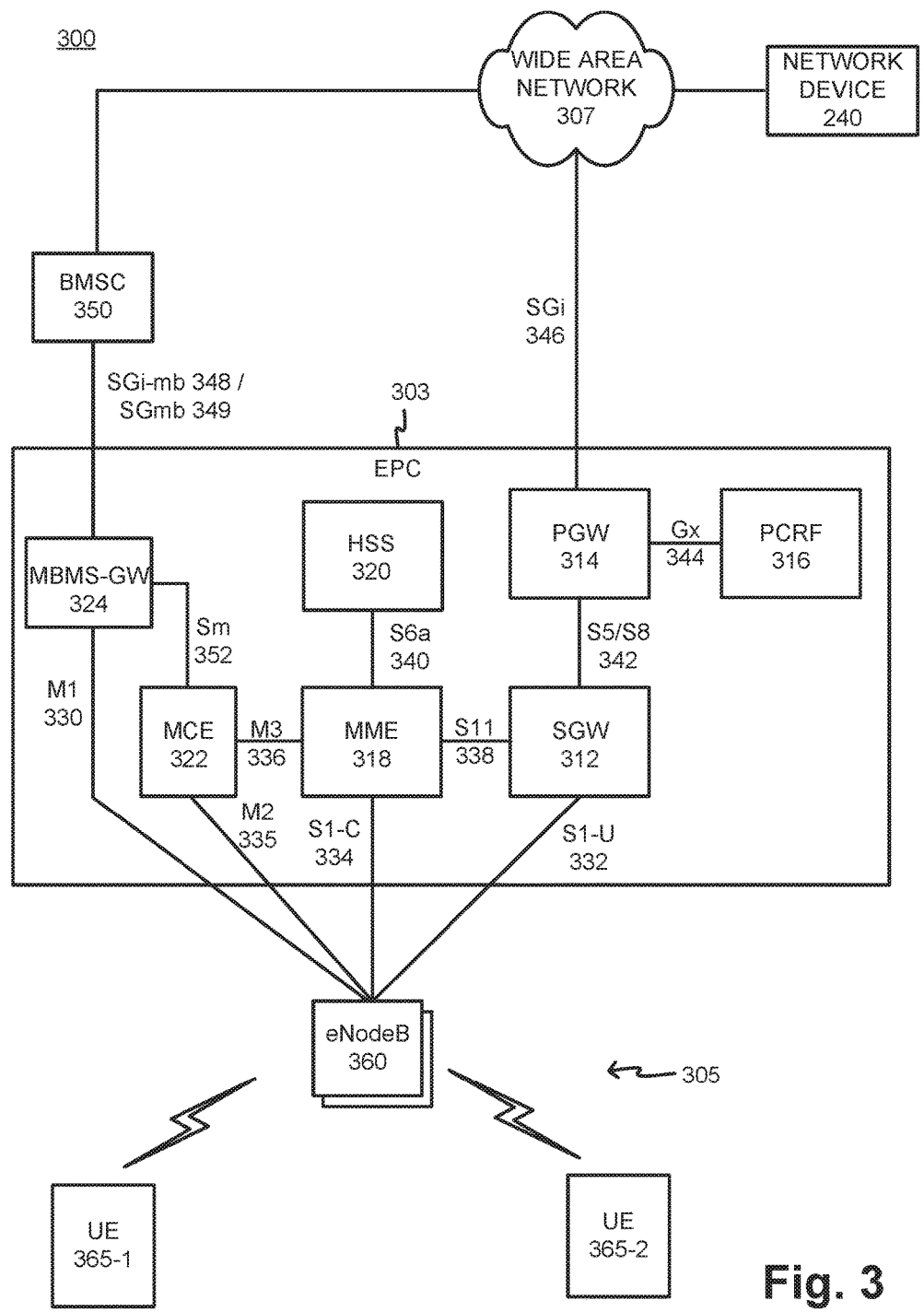
FIG. 3 is a block diagram illustrating an exemplary Long Term Evolution (LTE) networking environment according to an embodiment.

FIG. 3 is a block diagram illustrating an exemplary Long Term Evolution (LTE) networking environment 300 according to an embodiment. LTE environment 300 may include an evolved packet core (EPC) 303, an evolved Universal Mobile Telecommunications System (UMTS) Terrestrial Radio Access Network (eUTRAN) 305, and wide area network (WAN) 307. eUTRAN 305 may further include one or more mobile devices, such as, for example, User Equipment (UEs) 365-1 and 365-2 (as used herein, plurally referred to as "UE 365" and individually as "UE 365-*x*"), and one or more base stations, such as, for example, eNodeBs 360. A Broadcast Multicast Service Center (BMSC) 350 may be connected to both EPC 305 and WAN 307. Network device 240 may be connected to WAN 307. While environment 300 is shown in the context of an LTE network, it should be appreciated that embodiments presented herein may operate in any appropriate wireless network(s). EUTRAN 305 and EPC 303 may further include one or more devices that are physical and/or logical entities interconnected via standardized interfaces. EUTRAN 305 and EPC 303 may provide wireless packet-switched services and wireless Internet Protocol (IP) connectivity to mobile devices to provide, for example, data, voice, and/or multimedia services such as, for example, eMBMS. It is noted that FIG. 3 depicts a representative environment 300 with exemplary components and configuration shown for purposes of explanation. Other embodiments may include additional or different network entities in alternative configurations than which are exemplified in FIG. 3.

Network device 240 and/or BMSC 350 may interface to WAN 307 using an Ethernet connection over TCP/IP, where the physical interfaces may be any interface having sufficient resources to support the exchange of traffic alerts and traffic notifications. Such interfaces may include, for example, 10BASE-T, 1000BASE-TX, and/or 1000BASE-T over twisted pair, coaxial cable, and/or optical fiber.

Further referring to FIG. 3, EPC 303 may further include a serving gateway (SGW) device 312, a packet data network (PDN) gateway (PGW) 314, a Policy and Charging Rules Function (PCRF) 316, a mobility management entity (MME) 318, a home subscriber server (HSS) 320, a Multicast Coordination Entity (MCE) 322, and a Multimedia Broadcast Multicast System Gateway (MBMS-GW) 324. It is noted that FIG. 3 depicts a representative EPC 303 with exemplary components and configuration shown for purposes of explanation. Other embodiments may include additional or different network entities in alternative configurations than which are exemplified in FIG. 3.

Further referring to FIG. 3, eNodeBs 360 may include one or more devices and other components having functionality that allow UEs 365 to wirelessly connect to eUTRAN 305. ENodeBs 360 may interface with EPC 303 via a S1 interface, which may be split into a control plane S1-C interface 334 and a data plane S1-U interface 332. S1-C interface 334 may interface with MME 318. S1-C interface 334 may be implemented, for example, with a protocol stack that includes a Network Access Server (NAS) protocol and/or Stream Control Transmission Protocol (SCTP). S1-U interface 332 may interface with SGW 312 and may be implemented, for example, using a General Packet Radio Service Tunneling Protocol User Plane (GTP-U). ENodeBs 360 may communicate among themselves via an X2 interface (not shown). The X2 interface may be implemented, for example, with a protocol stack that includes an X2 application protocol and SCTP.

For MBMS (e.g., eMBMS) functionality, eNodeBs 360 may connect to MCE 322 over an M2 interface 335. The embodiment shown in FIG. 3 illustrates a "centralized MCE architecture" where MCE 322 may be a logical entity that can be deployed as a stand-alone physical entity, or collocated in another physical entity in EPC 303. In another embodiment (not shown), the EPC 303 may be realized using a "distributed MCE architecture" where a single MCE 322 is included in each eNodeB 360. MCE 322 may provide MBMS session control signaling over M2 interface 335 using SCTP, where MBMS session control signaling may include radio configuration data for multi-cell transmission modes. EnodeBs 360 may further communicate with MBMS-GW 324 over an M1 interface 330, and send (i.e., broadcast/multicast) MBMS packets to each eNodeB 360 which is transmitting data associated with the service. M1 330 interface may be a user plane interface for providing MBMS traffic that can be implemented using the MBMS synchronization protocol (SYNC) and GTP-U. The SYNC protocol helps eNodeBs 365 identify the timing for MBMS radio frame transmission and detect packet loss.

SGW 312 may provide an access point to and from UEs 365, may handle forwarding of data packets for UEs 365, and may act as a local anchor point during handover procedures between eNodeBs 360. SGW 312 may interface with PGW 314 through an S5/S8 interface 342. S5/S8 interface 342 may be implemented, for example, using GTP-U.

PGW 314 may function as a gateway to WAN 307 through a SGi interface 346. WAN 307 may include, for example, an IP Multimedia Subsystem (IMS) network, which may provide voice and multimedia services to UE 365, based on Session Initiation Protocol (SIP). A particular UE 365, while connected to a single SGW 312, may be connected to multiple PGWs 314, one for each packet network with which UE 365 communicates.

PCRF 316 provides policy control decision and flow based charging control functionalities. PCRF 316 may provide network control regarding service data flow detection, gating, Quality of Service (QoS) and flow based charging, etc. PCRF 316 may determine how a certain service data flow shall be treated, and may ensure that user plane traffic mapping and treatment is in accordance with a user's subscription profile. PCRF 316 may communicate with PGW 314 using a Gx interface 344. Gx interface 344 may be implemented, for example, using a Diameter protocol.

MME 318 may implement control plane processing for EPC 303 and eUTRAN 305. For example, MME 318 may implement tracking and paging procedures for UEs 365, may activate and deactivate bearers for UEs 365, may authenticate users of UEs 365, and may interface to non-LTE radio access networks. MME 318 may also select a particular SGW 312 for a particular UE 365-*x*. MME 318 may interface with other MMEs (not shown) in EPC 303 and may send and receive information associated with UEs 365, which may allow MME 318 to take over control plane processing of UEs 365 serviced by another MME device, if the other MME device becomes unavailable. MME 318 may communicate with SGW 312 through an S11 interface 338. S11 interface 338 may be implemented, for example, using General Packet Radio Service Tunneling Protocol Control plane (GTPv2-C). S11 interface 338 may be used to create and manage a new session for a particular UE 365-*x*. S11 interface 338 may be activated when MME 318 needs to communicate with SGW 312, such as when the particular UE 365 attaches to EPC 303, when bearers need to be added or modified for an existing session for the particular UE 365, when a connection to a new PGW 314 needs to created, or during a handover procedure (e.g., when the particular UE 365-*x* needs to switch to a different SGW 312).

HSS device 320 may store information associated with UEs 365 and/or information associated with users of UEs 365. For example, HSS device 320 may store user profiles that include authentication and access authorization information. MME 318 may communicate with HSS device 320 through an S6a interface 340. S6a interface 340 may be implemented, for example, using a Diameter protocol.

MCE 322 can be a separate entity as shown in FIG. 3 or be included as part of each eNodeB 360. MCE 322 may provide admission control through MBMS session control signaling and allocate wireless channel resources for UEs 365 in an MBMS area associated with eUTRAN 305. Specifically, MCE 322 may: 1) allocate time and frequency radio resources for eMBMS transmissions; and 2) determine radio configuration, such as, for example, the Modulation and Coding Scheme (MCS) for MBMS transmissions by eNodeBs 360. MCE 322 may also be connected with MME 318 over an M3 interface 336 to provide MBMS session control signaling (e.g., "MBMS Session Start" and "MBMS Session Stop" commands) on an eUTRAN Radio Access Bearer (E-RAB) level (i.e., no radio configuration data is conveyed). Exchanges over the M3 interface 336 may performed using SCTP.

MBMS-GW 324 (e.g., an eMBMS Gateway) distributes (i.e., multicasts and/or broadcasts) MBMS user plane data packets to eNodeBs 360 that participate in a multicast service in an MBMS area 110. The data packets may be distributed to participating eNodeBs 360 using Internet Protocol (IP) Multicast. MBMS-GW 324 may receive the MBMS data packets (e.g., content streams) from network device 240 via BMSC 350 through WAN 307. The MBMS data packets may be provided to MBMS-GW 324 over an SGi-mb interface 348. MBMS-GW 324 may also exchange MBMS session control signaling (e.g., session start/update/stop messages) with BMSC 350 over an SG-mb interface 349. The MBMS session control signaling received from BMSC 350 may be forwarded to MCE 322 over an Sm interface 352, which are in turn forwarded towards the eUTRAN 305 through MME 318. Sm interface 352 may be implemented using a GTPv2-C message protocol which may be carried over User Datagram Protocol (UDP) to start, stop, and modify MBMS sessions. MBMS-GW 324 may be a logical entity that exists as a separate device or may be collocated in another device within EPC 303.

BMSC 350 may act as gateway between content providers (e.g., network device 240) and MBMS-GW 324 in EPC 303. BMSC 350 may receive content streams from content providers over wide area network 307 via, for example, an Ethernet connection implementing TCP/IP. BMSC 350 may process the received data to facilitate its distribution as MBMS packets by EPC 303, and perform bearer processing which may include adding forward error correction and preparing the received data for unidirectional delivery of files using the File Delivery over Unidirectional Transport (FLUTE) protocol. BMSC 350 may also control and schedule the MBMS sessions by providing session control messages to MBMS-GW over SGmb interface 349. The session control messages may include service announcements, session start and stop messages, etc. The BMSC may also provide admission control for the MBMS services by providing session membership, user authorization and authentication, and security.

Network device 240 may include any type of server, media repository, streaming source, etc., that can provide the data so that BMSC 350 and EPC 303 may generate and transmit the multicast content streams. The content streams may include any form of media, text, audio, image, video, etc., which can be forwarded to EPC and be multicast to UEs 365. The network device 240 may store refinement files for use by UEs 365. Embodiments may provide multicast transmissions in accordance, for example, with LTE's eMBMS standard, and MBMS area 110 may be a Multimedia Broadcast over a Single Frequency Network (MBSFN) area. MBSFN multicast provides an efficient approach to deliver content streams over LTE, where Orthogonal Frequency Division Multiplexed (OFDM) signals enhance gain from signal frequency network transmission. Efficient signal combining at the UE receivers may achieve high operating Signal-to-Noise Ratios (SNRs). As used herein, an MBSFN area may include a group of eNodeBs (e.g., eNodeBs 360), along with their associated cells, which are coordinated to transmit substantially identical waveforms at the approximately same time. The coordinated transmission may be "seen" as a single transmission by the UEs located in the MBSFN area.

Wide Area Network 307 may include any type wired or wireless network covering larger areas. For example, WAN 307 may include a metropolitan area network (MAN), a Public Switched Telephone Network (PSTN), an ad hoc network, an intranet, the Internet, a fiber optic-based network, a wireless network, and/or a combination of these or other types of networks. WAN 307 may be an IP based network or utilize MultiProtocol Label Switching (MPLS), and may include a mesh network (e.g., IEEE 801.11s) and/or or a WiMAX IEEE 802.16. WAN 307 may include one or more circuit-switched networks and/or packet-switched networks.

FIG. 3 depicts a representative environment 300 with exemplary components and configuration and is shown for purposes of explanation. Other implementations may include fewer components, different components, differently arranged components, or additional components than exemplified in FIG. 3. Additionally or alternatively, one or more components of network 100 may perform functions described as being performed by one or more other components.

Figure 4:
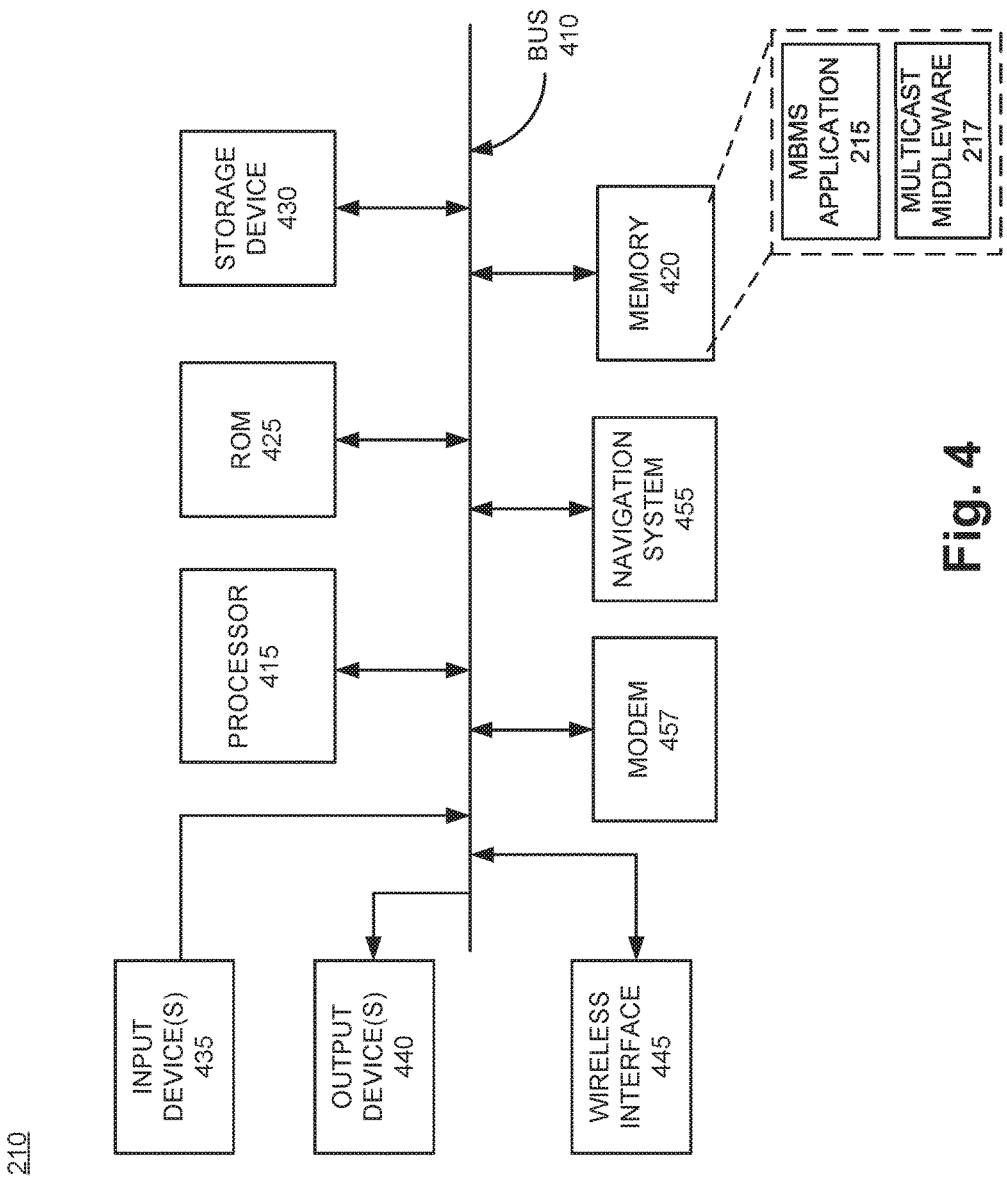
FIG. 4 is a block diagram showing exemplary components of a mobile device according to an embodiment.

FIG. 4 is a block diagram showing exemplary components of a mobile device 210 according to an embodiment. Mobile device 210 may include any mobile communication device configured to communicate with access network(s) 230-1 (e.g., eUTRAN 305) via wireless signals. For example, mobile device 210 may include a portable communication device (e.g., user equipment (UE) device, a mobile phone, a smart phone, a phablet device, a global positioning system (GPS) device, and/or another type of wireless device); an in-vehicle navigation system which may include a head unit for user interaction and control, a telephone terminal; a personal computer or workstation; a server device; a laptop, tablet, or another type of portable computer; a media playing device; a wearable computer (e.g., eyeglasses, wrist watch, etc.); a portable gaming system; and/or any type of mobile device with wireless communication capability.

Mobile device 210 may include a bus 410, a processor 415, memory 420, a read only memory (ROM) 425, a storage device 430, one or more input device(s) 435, one or more output device(s) 440, a wireless interface 445, a navigation system 455, and a modem 457. Bus 410 may include a path that permits communication among the elements of mobile device 210.

Processor 415 may include a processor, microprocessor, or processing logic that may interpret and execute instructions. Memory 420 may include a random access memory (RAM) or another type of dynamic storage device that may store information and instructions for execution by processor 415. In an embodiment, instructions corresponding to MBMS application 215 and/or multicast middleware 217 may be stored in memory 420. In other embodiments, instructions may also be stored, in whole, or in part, in ROM 425 and/or storage device 430 in addition to memory 420. MBMS application 215 may provide an interface permitting a user to select a content stream to receive. MBMS application 215 may further provide authentication and/or validation functionally for receiving content. Multicast middleware 217 may act as a "shim" layer between MBMS application 215 and modem 457. Multicast middleware 217 may control the modem to facilitate selection and reception of a broadcast and/or multicast.

ROM 425 may include a ROM device or another type of static storage device that may store static information and instructions for use by processor 415. Storage device 430 may include erasable solid state, magnetic and/or optical recording medium and its corresponding drive to store data and/or processor instructions when mobile device 210 is unpowered or in a power saving mode (e.g., a sleep state). Storage device 430 may include, for example, secure digital (SD) card, flash memory within mobile device 210, etc.

Input device(s) 435 may include one or more mechanisms that permit an operator to input information to mobile device 210, such as, for example, a keypad or a keyboard, a microphone, voice recognition, a touchscreen, and/or biometric mechanisms, etc. Output device(s) 440 may include one or more mechanisms that output information to the operator, including a display, a speaker, etc. Wireless interface 445 may include any transceiver mechanism that enables mobile device 210 to communicate with other devices and/or systems. For example, wireless interface 445 may include mechanisms for communicating with another device or system via a network, such as wireless network eUTRAN 305. Additionally, wireless interface 445 permits mobile device 210 to receive MBMS content streams.

Navigation system 455 may be any system that provides position data in an absolute reference (e.g., a satellite navigation system (SNS) receiver providing position data in the WGS-84 system) and/or relative reference(s) (e.g., accelerometers). When deriving positions, navigation system 455 may utilize a receiver specifically designed for use with the SNS that extracts position, using conventional techniques, from a plurality of signals transmitted by SNS satellites. Various SNS may be used, which typically include a system of transmitters positioned to enable mobile devices 210 to determine its location based on signals received from the transmitters. In a particular example, such transmitters may be located on Earth orbiting satellites. For example, a satellite in a constellation of Global Navigation System (GNS) such as Global Positioning System (GPS), Galileo, or Glonass may transmit a signal marked with a Pseudorandom Noise (PN) code that may be distinguishable from PN codes transmitted by other satellites in the constellation.

Modem 457 may facilitate signaling and coordination with network elements in EPC 303 for exchanging data via networks 230. Modem 457 may be a baseband processor that manages network protocols (e.g., MBMS), radio control functions, including signal modulation/demodulation, encoding, frequency shifting, etc., Modem 457 may thus facilitate both access stratum and non-access stratum functionality.

Mobile device 210 may perform certain operations or processes, as may be described in detail below in reference to FIG. 7. Mobile device 210 may perform these operations in response to processor 415 executing software instructions contained in a computer-readable medium, such as memory 420. A computer-readable medium may be defined as a physical or logical memory device. A logical memory device may include memory space within a single physical memory device or spread across multiple physical memory devices. The software instructions may be read into memory 420 from another computer-readable medium, such as storage device 430, or from another device via wireless interface 445. The software instructions contained in memory 420 may cause processor 415 to perform operations or processes that will be described in detail with respect to FIG. 7. Alternatively, hardwired circuitry may be used in place of or in combination with software instructions to implement processes consistent with the principles of the embodiments. Thus, exemplary implementations are not limited to any specific combination of hardware circuitry and software. The configuration of components of mobile device 210 illustrated in FIG. 4 is for illustrative purposes only. It should be understood that other configurations may be implemented. Therefore, mobile device 210 may include additional, fewer and/or different components than those depicted in FIG. 4.

FIG. 5 is a drawing of an exemplary data structure 500 which may be included in a refinement file. The refinement file may store parameters that define service subareas 130 for finely targeting MBMS content streams. It should be understood that the set of parameters may be stored in any type of data structure, and are not limited to the structure and/or data types exemplified in FIG. 5. The refinement file may store parameters that are delineated by columns in FIG. 5, where the parameters may include a descriptor for content 510, a service subarea name 520, and an area boundary definition 530.

Exemplary data structure 500 as shown in FIG. 5 defines three separate service subareas in each row corresponding to the following service subarea names 520: National Portrait Gallery 540, Verizon Center 550, and Gallery Place Chinatown Metro Station 560. However, data structure 500 may include any number of rows to provide the capability to define any arbitrary number of service subareas 130.

The descriptor for content 510 may include a string describing an aspect of the content associated with the service subarea 130. For example, content 510 may include a string such as "VIDEO" or "AUDIO" shown in rows 540, 550, respectively, which describe a data type for a content stream. Other data types could include any conventional data type, such as text, image, numerical, etc. Additionally or alternatively, the content 510 may include a description of the information represented by the content stream, such as, for example "EMERGENCY ALERTS" as shown in row 560.

The descriptor for service subarea name 520 may include a string describing the location of the service subarea 130-*x*. Service subarea name may be a specific name for a place, such as, for example "NATIONAL PORTRAIT GALLERY," VERIZON CENTER," or "GALLERY PLACE CHINATOWN METRO STATION" as illustrated in rows 540, 550, and 560, respectively in FIG. 5. Additionally or alternatively, service subarea name 520 may be more generic in its designation (e.g. "PARK") when specific information is not available.

The descriptor for area boundary definition 530 may include numeric values representing coordinates in a reference coordinate system to define each service subarea 130. The coordinates may include, for example, the standard WGS-84 reference system, which may provide a definition of service subarea 130-*x* on the surface of the Earth using geodetic coordinates (lat, lon) that may trace out the vertices of a polygon having any desired shape, such as, for example, shown in rows 540 and 560. Specifically, in row 540, six (lat, lon) coordinate pairs show latitude and longitude values that specify six corners of a polygon for the National Portrait Gallery. In row 560, four (lat, lon) coordinate pairs show latitude and longitude values that specify four corners of a square that define the Gallery Place Chinatown Metro Station. Alternatively, coordinates may be used with other information to represent the parameters of objects such as basic shapes. For example, in row 550, the area boundary definition 530 approximates the footprint of a stadium in the form of a circle having a center at the (lat, lon) coordinates (38.8981247,−77.020963) and a radius of 43 meters (e.g., designated as "R43" in row 550). Other common shape primitives may be used in different embodiments. In another embodiment, the area boundary definition 530 may be defined by a character string that may define an area boundary definition for a service subarea 130. The character string may be a predefined string that, for example, may be converted to coordinates by looking up coordinate values in a separate database.

In other embodiments, data structure 500 in the refinement file may have fewer or additional columns than shown in FIG. 5. For example, an additional column may be added to include security parameters, such as, for example, encryption keys for authentication, validation, and/or verification of user accounts.

Figure 6A:
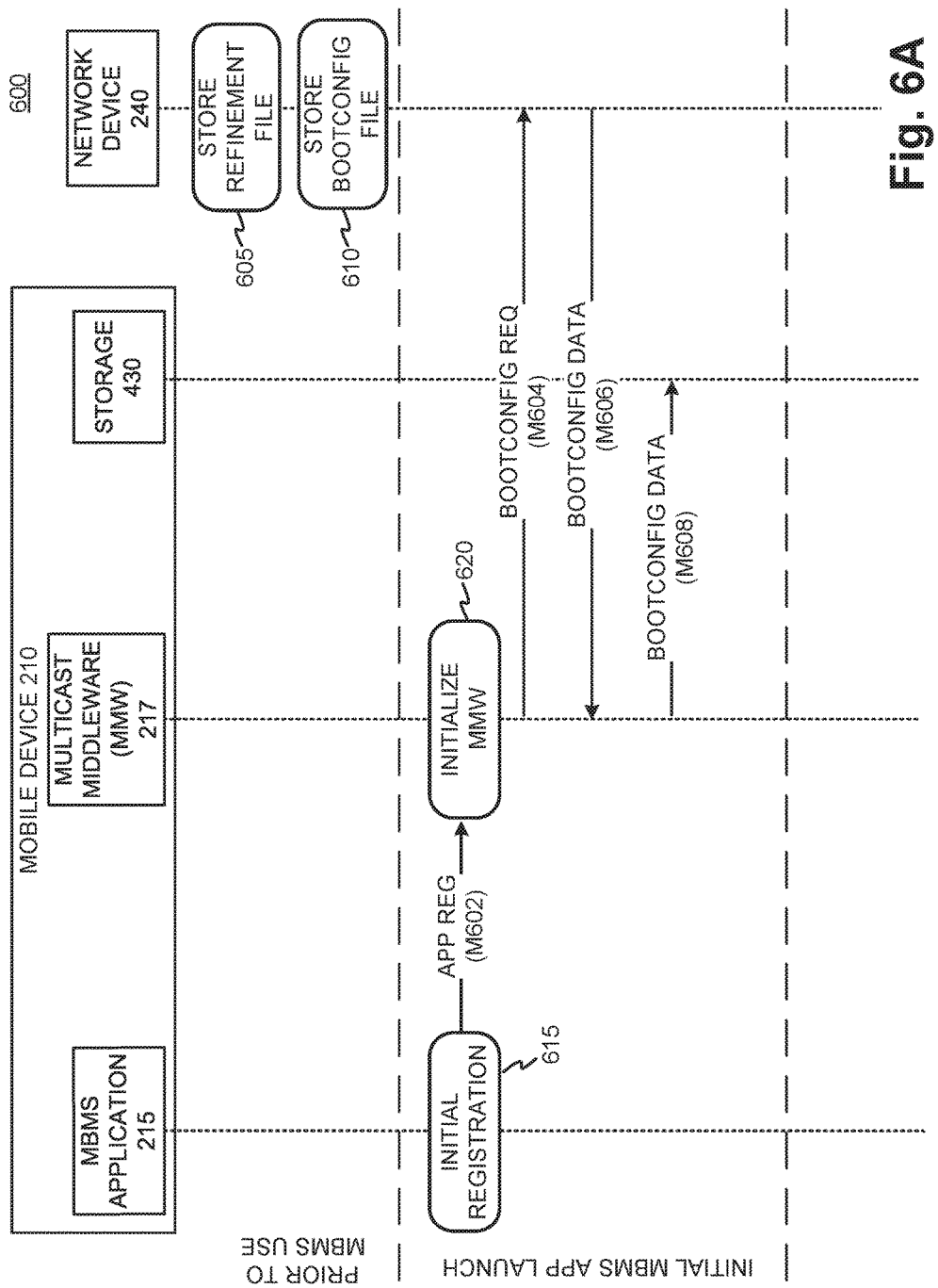

FIGS. 6A-6C are diagrams showing an exemplary signal flow 600 illustrating communications between network entities for refining MBMS service areas based on location. As shown in FIG. 6A, prior to MBMS use by mobile device 210, network device 240 may store the refinement file (Block 605) and also store a configuration file (e.g., a bootconfig file) (Block 610). The refinement file may be created offline, for example, by a network operator based on information provided developers and/or sponsors of MBMS application 215. Upon initial launch, MBMS application 215, may perform an initial registration (Block 615). During the initial registration, MBMS application 215 may send application registration information to multicast middleware (MMW) 217 (M602), which may include application and/or user credentials, operating specifications and/or requirement of MBMS application 215, etc. In response, initialization is performed by MMW 217 (Block 620), where the bootconfig file is fetched from network device 240. MMW 217 sends a bootconfig file request to network device 240 (M604). In response, network device 240 send the bootconfig file back to MMW 217 (M606). MMW 217 may then store the data from the bootconfig file by sending it to storage device 430 within mobile device 210 (M608).

Referring to FIG. 6B, after mobile device 210 enters MBMS service area 110, MMW 217 "listen" for MBMS communications on a relevant system interface block (SIB), and subsequently tune into a service discovery channel (SDCH). The SDCH is a standard mechanism used by wireless devices to receive information about various services. MMW 217 may read the SDCH and subsequently receive a service announcement (SA) file (Block 625). The SA file may include a list of all MBMS services. In an embodiment, a pointer (e.g. a link) may be present in the SA file which describes the network location of the refinement file. MMW 217 may obtain the refinement file location based on the pointer (Block 630). Once the network location is determined, MMW 217 may send a request to the network device 240 specified in the SA file (M612). In response to receiving and processing the request, network device 240 will send the refinement file to MMW 217 (M614). In an alternative embodiment, the refinement file may be embedded directly in the SDCH, and thus MMW 217 may obtain the refinement file directly from the SDCH. Further referring to FIG. 6B, MMW 217 may then provide the refinement file to storage device 430 on mobile device 210 (M616) (Block 635). MMW 217 may then discover one or more MBMS channels based on the information provided in the SDCH (Block 640). MMW 217 may then provide channel availability information to MBMS application 215 (M618).

Referring to FIG. 6C, MBMS application 215 may determine the position of mobile device 210 from navigation system 455, and then compare the determined position with area boundary definitions 530 in the refinement file (Block 640). If MBMS application 215 determines that mobile device 210 is within a given service subarea 130-x defined in the refinement file, MBMS application 215 may permit access to relevant content associated with a service subarea 130-x (Block 650). If mobile 210 is not located within a service subarea 130 listed in the refinement file, or the refinement file does not exist or cannot be read, then MBMS application 215 will proceed with a conventional MBMS process (Block 655).

Figure 7:
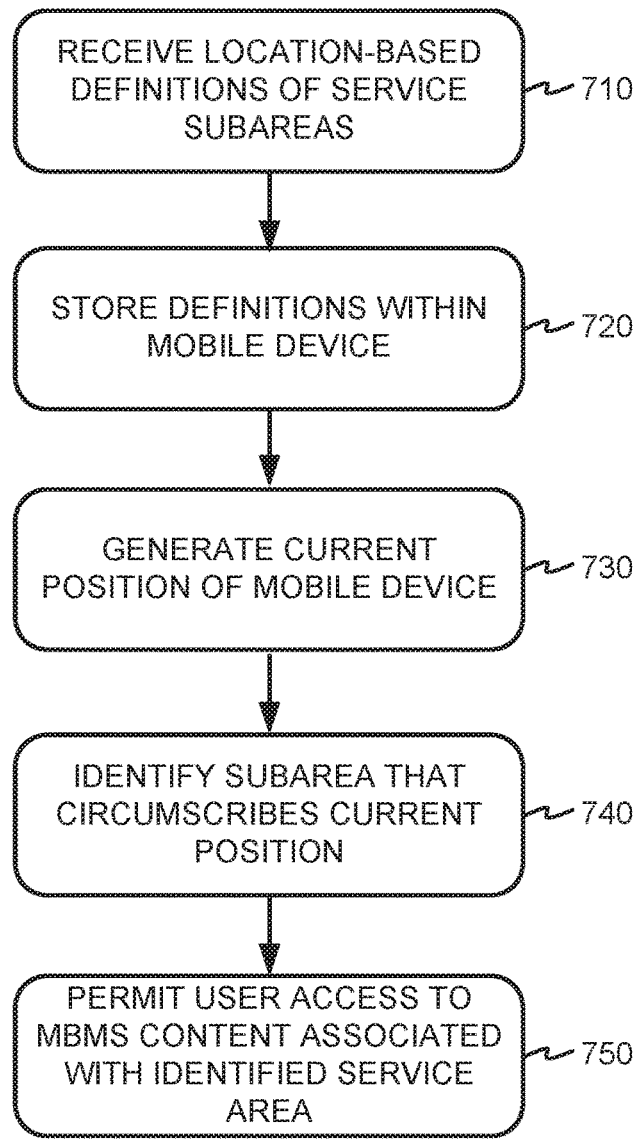
FIG. 7 is a flow chart showing an exemplary process for providing refined MBMS services based on location.

FIG. 7 is a flow chart showing an exemplary process 700 for refining MBMS services based on location. Process 700 may be performed by mobile device 210, for example, by executing instructions on processor 415. Mobile device 210 may initially receive location-based definitions of service subareas 130 located within MBMS service area 110 (Block 710). Different MBMS content may be associated with two or more service subareas 130. Mobile device 210 may then store the location-based definitions in storage device 430 (Block 720).

In an embodiment, the location-based definitions may be received in a refinement file from network device 240 after entering the MBMS service area 110. The refinement file may include coordinates defining a region for a service subarea, a name associated with the service subarea, and/or a descriptor for MBMS content associated with the defined service subarea 130, as discussed above with respect to FIG. 5).

In some implementations, mobile device 210 may also receive a service discovery channel (SDCH), and then decod a service announcement (SA) associated with the SDCH. The SA may include a list of MBMS services associated with the MBMS service area 110. Mobile device 210 may then read a link within the SA describing a network location to the refinement file, obtain the refinement file from network device 240 based on the link, and then store the refinement file in storage device 430. In an alternative embodiment, mobile device 210 may directly extract the refinement file embedded within the SDCH, instead of obtaining the refinement file from network device 240.

Further referring to FIG. 7, mobile device 210 may generate a current position of the mobile device (Block 730). The current position may be determined by navigation system 455. Mobile device 210 may then identify a service subarea 130-x that circumscribes the current position of the mobile device (Block 740). In other words, mobile device 210 determines whether it is located within a service subarea defined in the refinement file. In an embodiment, mobile device 210 may compare coordinates of the current position of mobile device 210 with the location-based definitions of the service subareas listed in the refinement file. Mobile device 210 may further determine, based on the above comparison in Block 740, that the coordinates of the current position are within a region described by the coordinates of the defined service subarea included in the refinement file, and then provide user access to MBMS content associated with the defined service subarea.

Further referring to FIG. 7, in response to identifying that mobile device is located within service subarea 130-x, mobile device 210 may permit user access to MBMS content associated with the identified service subarea 130-x (Block 750). For example, mobile device 210, when located in a theme park, mobile device may be provided access to promotions, schedules for concerts and/or shows, queues for rides when in an appropriate service subareas 130 designated within the theme park.

The foregoing description of implementations provides illustration and description, but is not intended to be exhaustive or to limit the invention to the precise form disclosed. Modifications and variations are possible in light of the above teachings or may be acquired from practice of the invention. For example, while series of messages and/or blocks have been described with regard to FIGS. 6A-6C and 7, the order of the messages and/or blocks may be modified in other embodiments. Further, non-dependent messaging and/or processing blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

The terms "comprises" and/or "comprising," as used herein specify the presence of stated features, integers, steps or components but does not preclude the presence or addition of one or more other features, integers, steps, components, or groups thereof. Further, the term "exemplary" (e.g., "exemplary embodiment," "exemplary configuration," etc.) means "as an example" and does not mean "preferred," "best," or likewise.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method, comprising:
   receiving, at a mobile device, location-based definitions of a plurality of service subareas located within a multimedia broadcast multicast service (MBMS) service area, wherein different MBMS content is associated with at least two service subareas of the plurality of service subareas;
   storing the received location-based definitions of the plurality of service subareas within the mobile device;
   generating a current position of the mobile device;
   identifying a service subarea from the plurality of service subareas that circumscribes the current position of the mobile device; and
   permitting, in response to the identifying, user access to MBMS content associated with the identified service subarea.

2. The method of claim 1, wherein the receiving the location-based definitions of the plurality of service subareas further comprises:
   receiving a refinement file from a network device after entering the MBMS service area.

3. The method of claim 2, wherein the refinement file includes at least one of coordinates defining a region for a service subarea, a name associated with the service subarea, or a descriptor for MBMS content associated with the service subarea.

4. The method of claim 3, wherein the identifying the service subarea that circumscribes the current position of the mobile device comprises:
   comparing coordinates of the current position of the mobile device with location-based definitions of the plurality of service subareas;
   determining, based on the comparing, that the coordinates of the current position are within a region described by the coordinates of the defined service subarea included in the refinement file; and
   providing, based on the determining, user access to MBMS content associated with the defined service subarea.

5. The method of claim 2, wherein the receiving the refinement file comprises:
   receiving a service discovery channel (SDCH); and
   decoding a service announcement (SA) associated with the SDCH, wherein the SA includes a list of MBMS services associated with the MBMS service area.

6. The method of claim 5, further comprising:
   reading a link within the SA describing a network location to the refinement file;
   obtaining the refinement file from the network device based on the link; and
   storing the refinement file in the mobile device.

7. The method of claim 5, further comprising:
   extracting the refinement file from the SDCH.

8. A mobile device, comprising:
   a wireless interface that communicates over a wireless channel;
   a memory configured to store instructions; and
   a processor, coupled to the wireless interface and the memory, wherein the processor is configured to execute the instructions stored in the memory to:
      receive location-based definitions of a plurality of service subareas located within a multimedia broadcast multicast service (MBMS) service area, wherein different MBMS content is associated with at least two service subareas of the plurality of service subareas,
      store the received location-based definitions of the plurality of service subareas within the mobile device,
      generate a current position of the mobile device,
      identify a service subarea from the plurality of service subareas that circumscribes the current position of the mobile device, and
      permit, in response to the identifying, user access to MBMS content associated with the identified service subarea.

9. The mobile device of claim 8, wherein the instructions to receive the location-based definitions of the plurality of service subareas further causes the processor to:
   receive a refinement file from a network device after entering the MBMS service area.

10. The mobile device of claim 9, wherein the refinement file includes at least one of coordinates defining a region for a service subarea, a name associated with the service subarea, or a descriptor for MBMS content associated with the service subarea.

11. The mobile device of claim 10, wherein the instructions to identify the service subarea that circumscribes the current position of the mobile device further causes the processor to:
    compare coordinates of the current position of the mobile device with location-based definitions of the plurality of service subareas;
    determine, based on the comparing, that the coordinates of the current position are within a region described by the coordinates of the defined service subarea included in the refinement file; and
    provide, based on the determining, user access to MBMS content associated with the defined service subarea.

12. The mobile device of claim 9, wherein the instructions to receive the refinement file further causes the processor to:
    receive a service discovery channel (SDCH); and
    decode a service announcement (SA) associated with the SDCH, wherein the SA includes a list of MBMS services associated with the MBMS service area.

13. The mobile device of claim 12, the memory comprising additional instructions further causing the processor to:
    read a link within the SA describing a network location to the refinement file;
    obtain the refinement file from the network device based on the link; and
    store the refinement file in the mobile device.

14. The mobile device of claim 12, the memory comprising additional instructions further causing the processor to:
    extract the refinement file embedded within the SDCH.

15. A non-transitory computer readable medium comprising instructions, which, when executed by a processor, causes the processor to:
    receive, at a mobile device, location-based definitions of a plurality of service subareas located within a multimedia broadcast multicast service (MBMS) service area, wherein different MBMS content is associated with at least two service subareas of the plurality of service subareas;
    store the received location-based definitions of the plurality of service subareas within the mobile device;
    generate a current position of the mobile device;
    identify a service subarea from the plurality of service subareas that circumscribes the current position of the mobile device; and permit, in response to the identifying, user access to MBMS content associated with the identified service subarea.

16. The non-transitory computer readable medium of claim 15, wherein the instructions to receive the location-based definitions of the plurality of service subareas further causes the processor to:
receive a refinement file from a network device after entering the MBMS service area.

17. The non-transitory computer readable medium of claim 16, wherein the refinement file includes at least one of coordinates defining a region for a service subarea, a name associated with the service subarea, or a descriptor for MBMS content associated with the service subarea.

18. The non-transitory computer readable medium of claim 17, wherein the instructions to identify the service subarea that circumscribes the current position of the mobile device further causes the processor to:
compare coordinates of the current position of the mobile device with location-based definitions of the plurality of service subareas;
determine, based on the comparing, that the coordinates of the current position are within a region described by the coordinates of the defined service subarea included in the refinement file; and
provide, based on the determining, user access to MBMS content associated with the defined service subarea.

19. The non-transitory computer readable medium of claim 16, wherein the instructions to receive the refinement file further causes the processor to:
receive a service discovery channel (SDCH); and
decode a service announcement (SA) associated with the SDCH, wherein the SA includes a list of MBMS services associated with the MBMS service area.

20. The non-transitory computer readable medium of claim 19, comprising instructions further causing the processor to:
read a link within the SA describing a network location to the refinement file;
obtain the refinement file from the network device based on the link; and
store the refinement file in the mobile device.

* * * * *